United States Patent [19]

Ikenaga

[11] Patent Number: 5,404,552
[45] Date of Patent: Apr. 4, 1995

[54] PIPELINE RISC PROCESSING UNIT WITH IMPROVED EFFICIENCY WHEN HANDLING DATA DEPENDENCY

[75] Inventor: Chikako Ikenaga, Hyogo, Japan

[73] Assignee: Mitsubishi Denki Kabushiki Kaisha, Tokyo, Japan

[21] Appl. No.: 805,776

[22] Filed: Dec. 12, 1991

[30] Foreign Application Priority Data

Mar. 1, 1991 [JP] Japan .................................. 3-036264

[51] Int. Cl.⁶ .............................................. G06F 1/00
[52] U.S. Cl. ..................................... 395/800; 395/375; 364/DIG. 1; 364/232.23; 364/231.8; 364/260; 364/258; 364/DIG. 2; 364/931.55
[58] Field of Search .................................. 395/80, 375

[56] References Cited

U.S. PATENT DOCUMENTS

| | | | |
|---|---|---|---|
| 4,831,515 | 5/1989 | Kamada et al. | 395/375 |
| 5,043,868 | 8/1991 | Kitamura et al. | 395/375 |
| 5,075,849 | 12/1991 | Kuriyama et al. | 395/400 |
| 5,123,108 | 6/1992 | Olson et al. | 395/800 |
| 5,222,240 | 6/1993 | Patel | 395/775 |

OTHER PUBLICATIONS

"MIPS-X: A 20-MIPS Peak, 32-bit Microprocessor with On-Chip Cache", IEEE Journal of Solid-State Circuits, vol. SC-22, No. 5, by Mark Horowitz et al, Oct. 1980, pp. 790-797.

Kai Hwang, et al, "Computer Architecture and Parallel Processing," pp. 187-203.

Primary Examiner—Alyssa H. Bowler
Assistant Examiner—L. Donaghue
Attorney, Agent, or Firm—Lowe, Price, LeBlanc & Becker

[57] ABSTRACT

Source operand data supplied from a register file are held in registers. The data of the registers and load data from a data memory are bypassed and supplied to a selection circuit. An execution stage includes an arithmetic and logic unit for performing an operation on the source operand data and a memory access stage includes an arithmetic and logic unit for performing an operation on data selected by the selection circuit. Selection of the selection circuit is controlled by data dependency between a load instruction and an operation instruction following the same. The output of the arithmetic and logic unit in the execution stage and the output of the arithmetic and logic unit in the memory access stage are selected in a selector according to a presence/absence of data dependency. Load data from the data memory is also supplied to the selector. If an operation instruction supplied following a load instruction uses load data, execution of this operation instruction in the memory access stage eliminates a pipeline stall and the need for inserting a "NOP" instruction for pipeline stall prevention, making it possible for an operational processing unit to operate at a high speed without causing a slot in the pipeline.

10 Claims, 7 Drawing Sheets

FIG. 7  PRIOR ART (a) LOAD INSTRUCTION (b) OPERATION INSTRUCTION

| φload | sel_result | SELECTED PORT |
|---|---|---|
| 0 | 0 | A |
| 1 | 0 | C |
| 0 | 1 | B |

PIPELINE RISC PROCESSING UNIT WITH IMPROVED EFFICIENCY WHEN HANDLING DATA DEPENDENCY

BACKGROUND OF THE INVENTION

1. Field of the Invention

The present invention relates generally to operational processing units and, particularly, relates to operational processing units for executing an instruction in a pipeline scheme. More particularly, the present invention relates to a reduced instruction set computer (RISC) employing the pipeline scheme.

2. Description of the Background Art

Most of execution of a program in a computer is spent for a very simple instructions such as "Load", "Store", "Branch On Condition", and "Add". Many of complicated control circuits in a computer are for processing an instruction requiring a plurality of cycles and an operand within a memory extending over a page boundary. The process speed can be increased if an infrequently-used complicated operation is not treated. Therefore, a reduced instruction set computer (RISC) has been developed, for processing only frequently-used simple instructions.

RISC adopts a load/store architecture in which a memory is accessed only by "Load" instruction and "Store" instruction. All arithmetic operation instructions and logical operation instructions are executed using data stored in internal registers. Therefore, the RISC has a multiplicity of registers and includes a register file as general-purpose registers. The RISC generally has the following characteristics:

(1) Execution of an instruction in 1 machine cycle;
(2) The lengths of all the instructions are the same (typically 32 bits) with simple fixed format;
(3) The memory is accessed only by "load" and "store" instructions and the remaining instructions are executed with reference to the register;
(4) Pipeline processing: processing of several instructions at the same time; and
(5) Hand-over of a function to software, i.e., the characteristic for enhancing the performance is realized by hardware and a complicated function is assigned to software.

The most important point for enhancing the performance of an operational processing unit is single cycle execution (execution of an instruction in 1 machine cycle) and to reduce a machine cycle as far as possible. The above-mentioned characteristic that an operation is carried out only on data in the registers and the memory is accessed only by the "load/store" instruction, is adopted for the single cycle execution. An instruction of the simple, fixed format reduces the decoding time of the instruction and shortens the machine cycle. The hand-over of a function to software means that the compiler is responsible for a complicated function. The optimization function of the compiler can also rearrange a sequence of instructions to be adaptable for the pipeline.

The RISC employs a pipeline control scheme for executing an instruction at high speed. There are several kinds of structures of the pipeline, and different RISCs include different pipeline structures.

Figure 1:
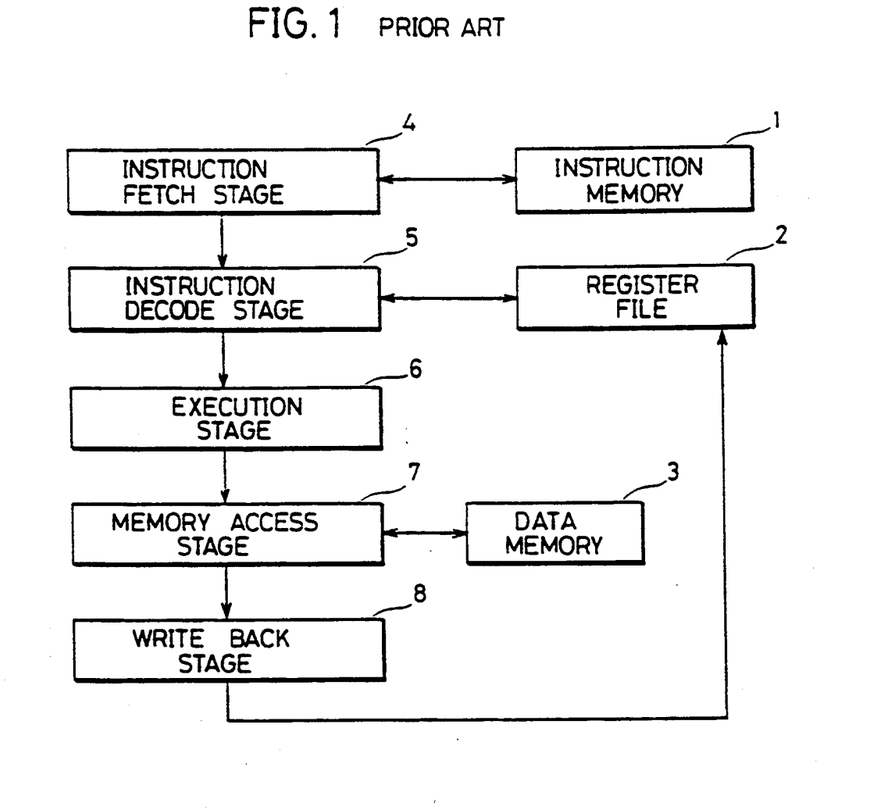
FIG. 1 is a diagram showing a general structure of a RISC computer of a pipeline scheme.

FIG. 1 is a diagram showing an example of a general functional structure of the RISC. In FIG. 1, the RISC includes an instruction memory 1 including a cache memory, for example, for storing instructions, a register file 2 including a plurality of registers for temporarily storing data, a data memory 3 for storing data, and pipeline stages of five stages 4 to 8.

The pipeline stages include an instruction fetch stage 4 for fetching an instruction from instruction memory 1, an instruction decode stage 5 for decoding the instruction fetched by instruction fetch stage 4, an execution stage 6 for executing the instruction decoded by instruction decode stage 5, a memory access stage 7 for accessing data memory 3 when the instruction decoded in instruction decode stage 5 is a memory access instruction, and a write back stage 8 for writing back the execution result of the operation instruction and the load data from data memory 3 into a corresponding register in register file 2.

Instruction memory 1 and data memory 3 includes a cache memory or the like. Instruction fetch stage 4 fetches a corresponding instruction from instruction memory 1 according to the output of a program counter (not shown) and supplies the same to instruction decode stage 5. Instruction decode stage 5 decodes a supplied instruction and reads out the contents of a corresponding register in register file 2. If the fetched instruction can be executed in the next execution stage 6, instruction decode stage 5 dispatches the decoded instruction to execution stage 6.

The instructions are executed in parallel according to the pipeline in the RISC. In some cases, there is data dependency between the instructions. For example, some operation result is utilized by the next operation instruction. In this case, instruction decode stage 5 generally delays dispatching of the instruction to execution stage 6 until the decoded instruction can be executed.

Execution stage 6 executes the supplied instruction if the decoded instruction is an operation instruction. If the decoded instruction is a branch instruction, execution stage 6 makes a determination on the branch condition. If the decoded instruction is a memory access instruction (load or store instruction), execution stage 6 calculates the effective address of data memory 3 and supplies the address to memory access stage 7.

Memory access stage 7 accesses data memory 3 including a cache memory, for example, according to the address from execution stage 6 and executes write/read of data.

The RISC operates according to two-phase, non-overlapping clock (T clock and L clock as will be described later). The RISC is pipelined and fetches a new instruction in each clock cycle. The RISC shown in FIG. 1 requires five cycles for completing execution of one instruction. However, it is pipelined so as to be able to start a new instruction in each clock cycle. The new instruction is started before the present instruction is completed.

Figure 2:
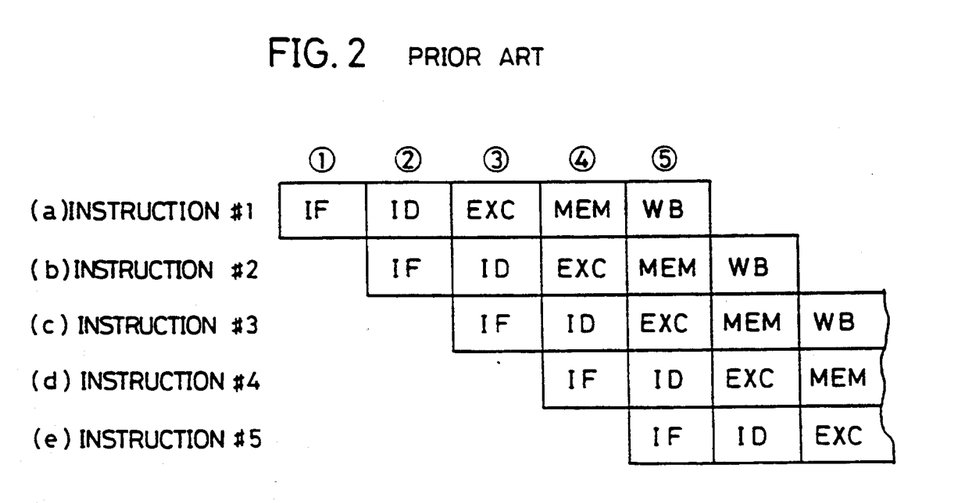
FIG. 2 is a diagram showing a manner of executing an instruction in the RISC computer shown in FIG. 1.

FIG. 2 shows the pipeline operation. In FIG. 2, an instruction #1 to an instruction #3 pass through the instruction fetch stage (IF), the instruction decode stage (ID), the instruction execution stage (EXC), the memory access stage (MEM), and the write back stage (WB). The instruction #2 is fetched in cycle 2 where the instruction #1 is in the stage of instruction decoding. The instruction #3 is fetched in cycle 3 where the instruction #2 is decoded. The instruction #5 is fetched in cycle 5 where the instruction #1 is written back. In this way, the instructions are executed in parallel, so that, as a whole, one instruction can be effectively executed in one machine cycle.

In instruction execution of the pipeline scheme, the next instruction is started before the present instruction is completed. Accordingly, there may be caused data dependency between instructions. In many cases, a determination is made in instruction decode stage 5 as to whether there is data dependency between the instructions. If there is the dependency between the instructions, the next instruction cannot be executed until the dependency is eliminated, causing a disturbance in the pipeline. The dependency between the instructions will now be described.

Figure 3:
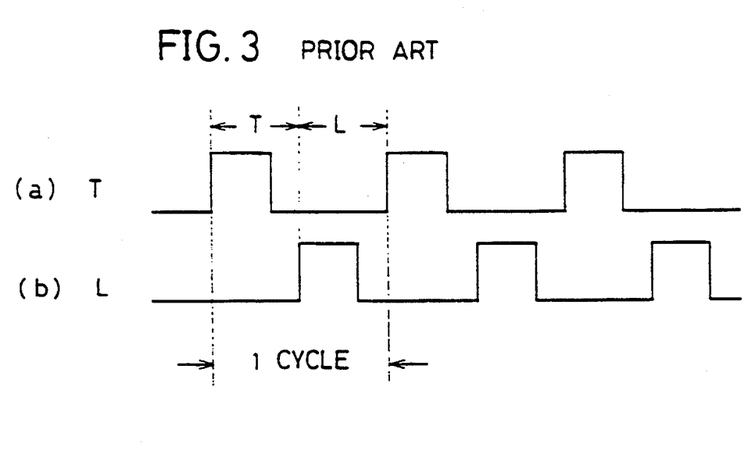
FIG. 3 is a diagram showing a clock signal used in the RICS computer.

As shown in FIG. 3, the RISC operates in response to the two-phase clock signal, i.e., T clock and L clock. The T clock phase and the L clock phase make one machine cycle. In execution stage 6, the operation is performed in T clock phase and the operation result is transmitted on a bus in L clock phase. In the case of a branch-on-condition instruction, the branch target address is calculated by an adder built in a program counter contained in instruction fetch stage 4 in T clock phase of execution stage 6.

In the case of a load or store instruction, execution stage 6 calculates an effective address in T clock phase and transmits the effective address to an address pin in L clock phase. In memory access stage 7, this address is transmitted to data memory 3 in T clock phase and data is written in or read out from data memory 3 in L clock phase. The execution result (operation result or load data) of the instruction is written into the register file in T clock phase by write back stage 8.

There are cases where an instruction is a conditioned branch instruction, where some instruction utilizes the execution result of the previous instruction and where some instruction utilizes data read out from the data memory, and in these cases there is the dependency of one instruction on another. Now consider the case of a load instruction.

The data loaded from data memory 3 is not valid until the memory access cycle is finished in memory access stage 7. Accordingly, this data loaded from memory 3 cannot be utilized in the execution stage of the next instruction. Now specifically consider the next instructions.

(a) load 1r0, (1r1)

(b) and 1r3, 1r2, 1r0

The instruction (a) is an instruction commanding that the data of the memory cells of the address stored in register 1r1 of register file 2 should be read out from data memory 3 and be loaded in register 1r0 in register file 2.

The instruction (b) is an instruction commanding that a logical product of the data stored in registers 1r2 and 1r0 of register file 2 should be taken and the result thereof should be stored in register 1r3 of register file 2.

Figure 4:
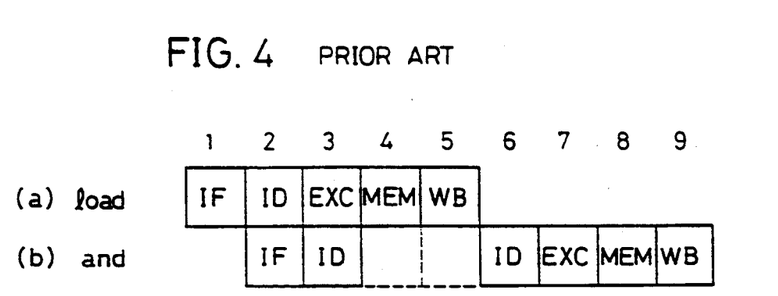
FIG. 4 is a diagram illustrating disturbance in a pipeline when there is caused data dependency of one instruction on another in a conventional operational processing unit of the pipeline scheme.

As shown in FIG. 4, the instruction (a) (load instruction) requires five cycles for completion thereof. The contents of register 1r0 are not determined until the write back stage WB of this instruction (a) (load instruction) is completed. Normally, in register file 2, data is written in T clock phase and data is read out in L clock phase. Instruction decode stage 5 and write back stage 8 can access register file 2. Execution stage 6 cannot access register file 2.

If the write back stage (cycle 5) simply waits until the result of the instruction (a) (load instruction) is written into register 1r0 of register file 2, the instruction (b) needs to read out the contents of register 1r0 of register file 2 in the sixth cycle and dispatches the same to execution stage 6 in FIG. 4. Accordingly, execution of the instruction (b) (AND instruction) is delayed by three machine cycles. As a result, slots are caused in the pipeline, decreasing the speed of processing the instruction.

In order to minimize the occurrence of slots in the pipeline due to the dependency of one instruction on another as stated above, in some cases, there is provided hardware called a bypass architecture or a forwarding architecture. In this architecture, necessary operand data is supplied to an arithmetic and logic unit using another path in order to minimize the halt in executing an instruction if the operand data of the instruction cannot be utilized although the instruction reaches the execution stage and the processor is ready to execute the instruction. The bypass architecture will be briefly described in the following.

There are two kinds of bypass architectures (or forwarding architectures), i.e., a load bypass architecture for data loaded from data memory 3 and a result bypass architecture for the result operated in the arithmetic and logic unit.

Figure 5:
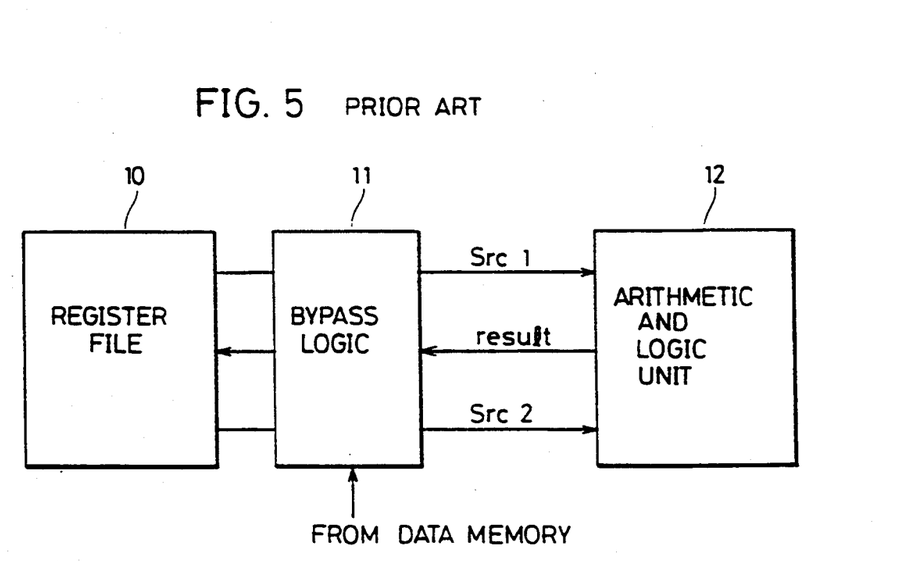
FIG. 5 is a diagram schematically showing a structure for realizing a bypass architecture used in a conventional RISC computer.

FIG. 5 is a diagram schematically showing a structure of the bypass architecture. In FIG. 5, a bypass logic 11 is provided in the data bus, for controlling the data transfer between a register file 10 and an arithmetic and logic unit 12. Register file 10 includes not only a general-purpose register (register file 2 in FIG. 1) but also a register for pipeline bypass and an I/O register for temporarily storing input/output data of data memory 3. Data of register file 10 is read out to a first source bus Src1 and a second source bus Src2 according to first and second source operands contained in the instruction. Writing back of data into register file 10 is carried out through bypass logic 11.

Bypass logic 11 includes a latch for latching the load data from data memory 3 and the operation result (data on the result bus "result") from arithmetic and logic unit 12. Bypass logic 11 compares two register sources (source operands) of the current instruction with the destination operand of the preceding instruction and makes a determination as to whether a bypass operation is needed. If it is determined that the bypass operation is needed, bypass logic 11 transmits the latched data onto source bus Src1 or Src2 without reading out the same from register file 10. Bypass logic 11 also carries out the bypass operation if the current instruction needs the operation result of the preceding instruction. Only the bypass operation of the load data will be described in the following. The load data latched by bypass logic 11 is written back in a corresponding register in the write back cycle if it is necessary to write back the same into the corresponding register within register file 10.

Figure 6:
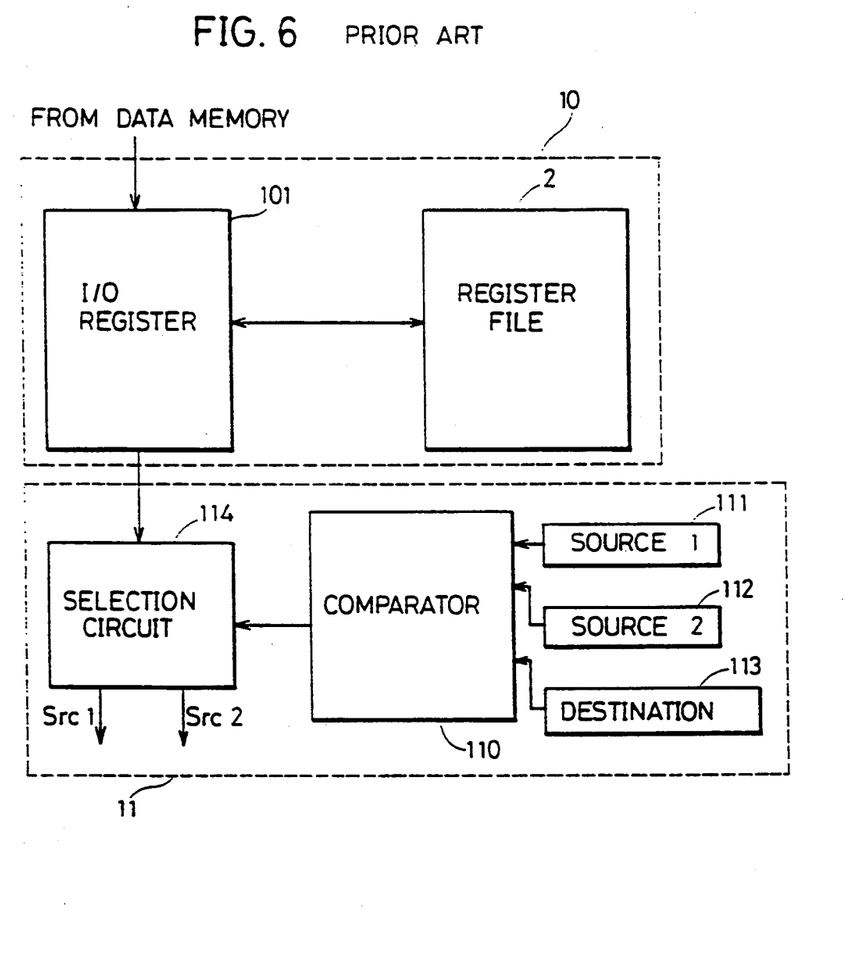
FIG. 6 is a diagram showing a specific structure of the bypass logic shown in FIG. 5.

FIG. 6 is a diagram more specifically showing the structure of the bypass logic. The structure of the bypass architecture is described, for example, in M. Horowitz: "MIPS-X: A 20-MIPS Peak, 32-bit Microprocessor with On-Chip Cache", IEEE Journal of Solid-State Circuits, vol. SC-22, No. 5, October 1980, pp. 790-797.

In FIG. 6, bypass logic 11 includes a register latch 111 for temporarily storing a first source operand (source 1) of the current instruction, a register latch 112 for temporarily storing a second source operand (source 2) of the current instruction, a register 113 for storing a destination operand (destination) of the preceding instruction, a comparator 110 for comparing the contents of register latches 111 and 112 with the contents of register 113, and a selection circuit 114 responsive to the output of comparator 110 for transmitting data (latch data) of an I/O register 101 contained in register file 10 to a source bus Src1 or Src2. In this case, generally, in bypass logic 11, the source operand of the current instruction is compared with destinations of two preceding instructions, and two registers 113 are provided. However, only one register for destination is shown in FIG. 6 in order to simplify the description.

I/O register 101 latches the data loaded from data memory 3 and temporarily stores data to be written into data memory 3 at the time of storing. The load data of I/O register 101 is written into a corresponding register of register file 2 by write back stage 8. If the contents of the corresponding register of register file 2 are updated by an operation before the writing of the data, the load data latched by I/O register 101 is discarded and is not written into the corresponding register. A brief description will be made below of the operation.

The source 1 and the source 2 of the source operands contained in the fetched instruction are stored into register latches 111 and 112 by instruction decode stage 5. The destination operand of the preceding instruction is also stored in register 113 by instruction decode stage 5. Comparator 110 compares the source operands stored in register latches 111 and 112 with the operand stored in register 113. If a coincidence therebetween is detected, comparator 110 generates a control signal to selection circuit 114. Selection circuit 114, in response to the control signal from comparator 110, transmits the data being latched in I/O register 101 onto source bus Src1 or Src2 corresponding the source operand for which the coincidence is detected.

The source buses are coupled to arithmetic and logic unit 12 as shown in FIG. 5. Accordingly, the data loaded in the memory access cycle is bypassed to arithmetic and logic unit 12 included in execution stage 6 without being stored in register file 2. As a result, in practice, slots in the pipeline can be reduced compared with the case where the load data is written into register file 2 and then the data is read out again.

Figure 7:
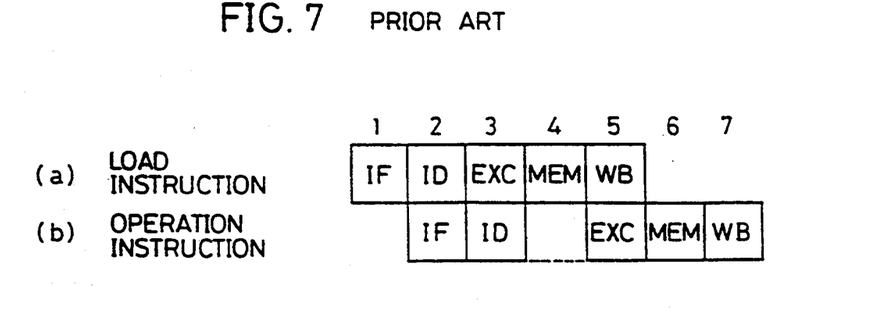
FIG. 7 is a diagram illustrating a slot in a pipeline when the conventional bypass architecture is employed.

Even if such a bypass architecture is employed, however, the slots in the pipeline cannot be completely eliminated if the operation instruction is executed after the load instruction and the operation instruction uses the data loaded by the load instruction. That is, as shown in FIG. 7, the data loaded by the load instruction has been latched into I/O register 101 when the memory access cycle MEM of cycle 4 is completed. If the data latched into I/O register 101 is bypassed to arithmetic and logic unit 12, instruction (FIG. 7(b)) can use the determined operand data and can be carried out in cycle 5 for the first time. Accordingly, in cycle 4, a slot (pipeline interlock) is caused in the pipeline of the operation instruction following the load instruction, reducing the processing speed.

The bypass logic is contained in instruction decode stage 5. Therefore, in cycle 5, instruction decode stage 5 does not carry out decoding again and execution of the operation is being carried out by execution stage 6.

As stated above, in order to cope with a case where a slot is caused in the pipeline due to data dependency of an instruction such as an operation instruction following a load instruction, a determination is made as to whether the instruction can be executed in instruction decode stage 5 and the pipeline is stalled (supplying the instruction into execution stage 6 is delayed) according to the result of the determination. Alternatively, a "NOP" instruction is interposed between the instructions one of which is dependent on another, by a compiler or the like in advance so that such a pipeline stall is not caused.

Stalling of the pipeline, however, causes a reduction in the processing speed, and interposing of the idle instruction, that is, "NOP" commanding no operation, also causes a decrease in the processing speed.

SUMMARY OF THE INVENTION

An object of the present invention is to provide an operational processing unit capable of executing an instruction at high speed even if there is data dependency of one instruction on another.

Another object of the present invention is to provide an operational processing unit causing no slot in the pipeline even if there is data dependency between a load instruction and an operation instruction following the load instruction.

Another object of the present invention is to provide an operational processing method in which instructions can be executed at high speed even if there is data dependency between the instructions.

An operational processing unit according to the present invention includes memory access means for reading out corresponding data from a data memory according to a load instruction, register access means for reading out corresponding data from a register file according to an operation instruction supplied following the load instruction, determination means for making a determination as to whether there is data dependency between the operation instruction and load instruction, first operational means for performing a predetermined operation on data read out from the register file by the register access means, first selection means for selecting data out of the data read out by the memory access means and the data read out by the register access means according to the determination result by the determination means, second operational means for performing a predetermined operation on the data selected by the selection means, and second selection means for selecting either of the first and second operational means according to the result of the determination by the determination means.

In accordance with the present invention, operation on data loaded from the data memory and data read out from the register file is selectively performed in the second operational means, due to the first selection means. The first operational means carries out operation on the data read out from the register file. Accordingly, by selecting the result of the operation of the second operational means if the operation instruction uses data loaded from the data memory, an instruction can be executed at high speed without a slot in the pipeline, compared with a structure where the operation is carried out using the first operational means only.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 8:
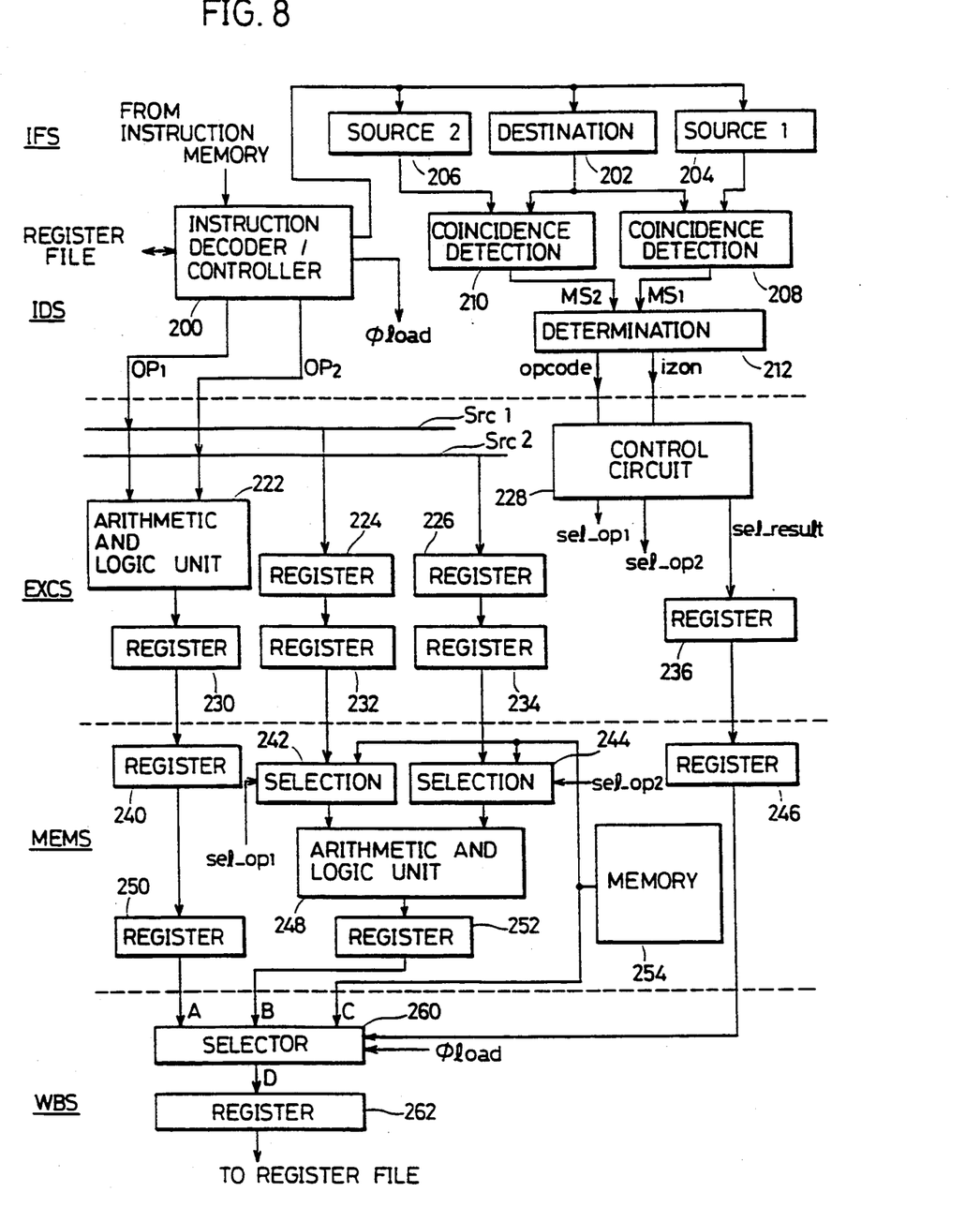
FIG. 8 is a diagram showing a structure of the main portion of an operational processing unit according to one embodiment of the present invention.

FIG. 8 is a diagram showing the structure of an operational processing unit in accordance with one embodiment of the present invention. The operational processing unit shown in FIG. 8 includes pipeline stages of five stages in the same way as the operational processing unit shown in FIG. 1. In FIG. 8, an instruction decode stage (IDS) includes an instruction decoder/controller 200 for decoding an instruction fetched from an instruction memory (corresponding to 1 of FIG. 1) and reading out the contents OP1, OP2 of source registers which the decoded instruction designates, register latches 204, 206 for storing each operand (register address) of a first register source (source 1) and a second register source (source 2) included in the currently provided instruction under the control of decoder/controller 200, and a register latch 202 for storing a destination register operand (register address) included in a load instruction.

Instruction decode stage IDS further includes a coincidence detection circuit 210 for detecting a coincidence between data latched in destination register latch 202 and data stored in register latch 204, a coincidence detection circuit 208 for detecting a coincidence between data stored in register 202 and register latch 206, and a determination circuit 212 for making a determination as to whether there is data dependency between a load instruction and an instruction supplied subsequently.

Instruction decoder/controller 200, if the currently provided instruction is a load instruction, also generates a signal Φload indicating that the instruction is a load instruction. The structure of register 202, register latches 204, 206 and coincidence detection circuits 208, 210 is the same as the structure of the by-pass logic shown in FIG. 6 and coincidence detection circuits 208, 210 are equivalent in function to the comparator in FIG. 6. Coincidence detection circuits 208 and 210 generate detection signals MS1 and MS2 indicating coincidence detection, respectively. Determination circuit 212 determines that there is data dependency between a preceding load instruction and a succeedingly supplied operation instruction if either of the detection signals MS1 and MS2 is in an active state (true state), and generates a control signal "izon" indicating the dependency and a signal "opcode" indicating which data of the first and second register sources uses the data of the load instruction.

In this case, operands (register addresses) of the register sources and the destination register may be sequentially stored in registers 202, 204 and 206 regardless of the kind of instruction every time an instruction is supplied from instruction fetch stage IFS, and only determination circuit 212 may be activated in the cycle only when a load instruction is supplied and, succeedingly, an operation instruction is provided.

Instead of this structure, when a load instruction is supplied, the destination register operand therein may be stored in register 202, and then when an operation instruction is supplied, operands of the register sources therein may be stored in registers 204 and 206, and in other cases, the contents of these registers may be reset to an appropriate initial value. In this case, it is necessary to reset register 202 and register latches 204, 206 to initial values different from each other.

Instruction decoder/controller 200 also has a function of reading out data OP1 of a first operand (a first register source) and data OP2 of a second operand (a second register source) of a corresponding register from the register file according to the fetched instruction, though its path is not clearly shown.

Data OP1, OP2 of the first and second operands read out from the register file by instruction decoder/controller 200 are transmitted onto first and second source buses Src1 and Src2, respectively.

An execution stage EXCS includes an arithmetic and logic unit 222 for receiving the data OP1 and OP2 on the first and second source buses Src1, Src2 and performing a predetermined operation thereon, a register 224 for latching the data OP1 on the first source bus Src1 according to T clock, and a register 226 for latching the data OP2 of the second operand on the second source bus Src2 according to T clock.

Execution stage EXCS further includes a control circuit 228 for receiving control signals "izon" and "opcode" from instruction decode stage IDS and generating control signals sel_op1, sel_op2 and sel_result. The control signal sel_op1 indicates that the first operand in the currently executed instruction uses the data loaded by the preceding load instruction. The control signal sel op2 indicates that the data loaded by the preceding load instruction is used as the data OP2 of the second operand in the currently executed operation instruction. The control signal sel_result indicates that the load data of the preceding load instruction is used by the currently executed operation instruction.

Instruction execution stage EXCS, for its pipeline operation, includes a register 230 for latching the output of arithmetic and logic unit 222 according to L clock, registers 232, 234 for latching the latch data of registers 224 and 226 according to L clock, and a register 236 for latching the control signal sel_result from control circuit 228 according to T clock. There may be provided a latch for delay (latching according to L clock) in order to adjust to the operation timing of the memory access stage the control operation timing of the control signals sel_op1 and sel_op2, taking into account the generation timing thereof.

A memory access stage MEMS includes a register 240 for latching the output of register 230 in execution stage EXCS according to T clock, a selection circuit 242 for selecting either of the data stored in register 232 and the data loaded from data memory 254 according to the control signal sel_op1, a selection circuit 244 for selecting either of the data stored in register 234 and the load data from memory 254 according to the control signal sel_op2, and an arithmetic and logic unit 248 for performing a predetermined operation on the data supplied from selection circuits 242 and 244.

Though there is shown no path by which data memory 254 is accessed for data writing and data reading in the memory access stage MEMS, memory 254 is accessed according to a memory address calculated in arithmetic and logic unit 222 of execution stage EXCS and data is input to and output from memory 254 through an I/O register contained in the above-mentioned register file or a clocked buffer. The load data from data memory 254 is stored in the I/O register and directly bypassed to selection circuits 242 and 244 at the same time. Accordingly, the input signals of selection circuits 242, 244 and arithmetic and logic unit 248 are determined when the memory cycle of memory access stage MEMS for the load instruction is finished.

Memory stage MEMS further includes a register 250 for latching the contents of register 240 according to L clock.

A write back stage WBS includes a selector 260 for receiving the data of register 250 at its A input, the data of register 252 at its B input, and the output of data memory 254 at its C input, and selecting and transmitting a corresponding input to the D output according to delay signals (supplied by registers 236 and 246 of two cascaded stages) of the control signal sel result from control circuit 228 and the control signal Φload, and a register 262 for latching the output of selector 260 according to T clock. The contents of register 262 are written back to a corresponding register of the register file. The corresponding register is determined by the destination register operand included in the operation instruction. The load data from memory 254 may be applied to selector 260 through the I/O register (L clock latch) and the load data may be directly supplied to selection circuits 242, 244, not through the I/O register. Memory 254 may be accessed by a clocked buffer, not through the I/O register.

It should be noted that the registers of execution stage EXCS, memory stage MEMS and write back stage WBS shown in FIG. 8 are mere latches and different from the registers in the register file.

Figure 9:
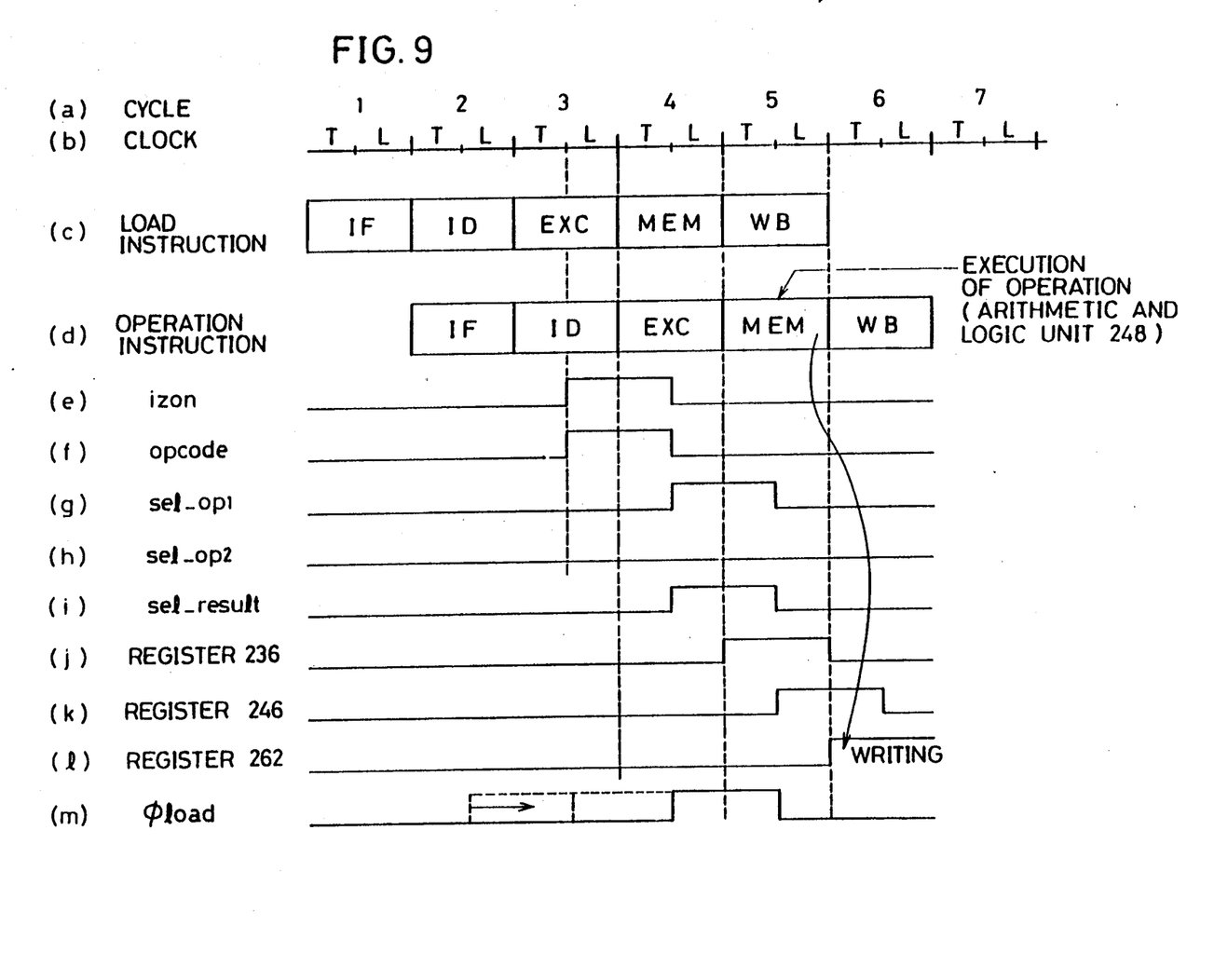
FIG. 9 is a signal waveform diagram showing the operation of the operational processing unit shown in FIG. 8.

FIG. 9 is a signal waveform diagram showing the operation of the operational processing unit shown in FIG. 8. A description will be made below of the operation of the operational processing unit in accordance with one embodiment of the present invention with reference to FIGS. 8 and 9.

Instruction decoder/controller 200 decodes the instruction fetched from instruction fetch stage IFS (cycle 2). If this instruction is a load instruction, instruction decoder/controller 200 generates a control signal Φload indicating that it is a load instruction and stores an operand included in this instruction indicating a destination register into register 202. In accordance with this load instruction, instruction decoder/controller 200 reads out a memory address contained in the register file to arithmetic and logic unit 222.

In execution stage EXCS, arithmetic and logic unit 222 calculates an address according to this load instruction and supplies the same to memory access stage MEMS. Then, the operation instruction is decoded by instruction decoder/controller 200 in parallel with the address calculation by the load instruction in execution stage EXCS (cycle 3).

When instruction decoder/controller 200 detects that the operation instruction has been provided following the load instruction, it writes data operands representing the first and second register sources contained in this operation instruction into registers 204 and 206, respectively, reads out the data OP1 and OP2 stored in the registers in register file designated by the operands of the register sources, respectively, and transmits the same onto source buses Src1 and Src2. The data OP1 is data stored in the first source register of the operation instruction and the data OP2 is data stored in the source register designated by the second source operand of the operation instruction. Now consider a case where the first source register designated by the first operand uses the data loaded from memory 254 by the preceding load instruction. As correct data has not been written into the first source register yet in this cycle 3, in this state, a correct operation cannot be carried out in the execution stage.

In cycle 3, a coincidence detection operation is carried out by coincidence detection circuits 208 and 210 in instruction decode stage IDS, and a detection signal MS1 indicating a coincidence from coincidence detection circuit 208 is brought to a true state while a detection signal MS2 from coincidence detection circuit 210 is brought to a false state. Determination circuit 212 generates a control signal "izon" indicating that there is data dependency according to the detection signals MS1 and MS2, notifying the following stages that the operation result obtained in this execution stage EXCS is not correct.

Determination circuit 212 generates a control signal "opcode" for indicating which of the first operand and the second operand has data dependency. In this case, as the first operand (the first register source) has the data dependency, the signal "opcode" is "1". This control signal "opcode" may be a signal of 2 bits and indicate that the first operand has the data dependency when it is "01" and that the second operand has the data dependency when it is "10".

In cycle 4, memory 254 is accessed according to the load instruction and corresponding data is loaded. The data loaded from memory 254 is directly supplied to selection circuits 242 and 244.

In execution stage EXCS, control circuit 228 sets signals sel_op1 and sel_op2 indicating which operand has dependency in a settled state in L clock phase and generates a control signal sel_result indicating that arithmetic and logic unit 248 output should be selected according to the control signals "izon" and "opcode".

Registers 224 and 226 latch the first and second operand data OP1 and OP2 supplied onto source buses Src1 and Src2 in T clock phase of cycle 4, and registers 232 and 234 latch the contents of registers 224 and 226 in L clock phase of this cycle 4. The control signal sel result is latched by register 236 in T clock phase of cycle 5.

In cycle 5, the load data from memory 254 has already been supplied to selector 260. In this cycle 5, the load indicating signal Φload from instruction decoder/controller 200 has been provided and, at this time, the select signal (the delayed signal of sel_result) from register 246 is still in the false state. In this state, selector 260 selects load data from memory 254 supplied to input C and supplies the same to register 262. Register 262 latches the output of selector 260 in T clock phase of cycle 5. The data latched by register 262 is written back in a destination register designated by an operand contained in the load instruction by write back stage WBS.

In cycle 5, the select control signals sel—op1 and sel—op2 are in a determined state in selection circuits 242 and 244. As the first operand has the data dependency, the control signal sel—op1 is in the true state and the control signal sel—op2 is in the false state. At this time, selection circuit 242 selects load data from data memory 254 and supplies the same to one input of arithmetic and logic unit 248 while selection circuit 224 selects data from register 234 and supplies the same to the other input of arithmetic and logic unit 248. Arithmetic and logic unit 248 performs a predetermined operation on the data from selection circuits 242 and 244 and then supplies the operation result to register 252. Register 252 latches the output of arithmetic and logic unit 248 in L clock phase.

Accordingly, in this case, at the end of cycle 5, a correct operation result has been stored in register 252. That is, correct data has already been selected by selection circuits 242 and 244 in T clock phase of the memory access cycle of this operation instruction and the output of arithmetic and logic unit 248 has become a correct value by L clock phase. Accordingly, correct data is latched by register 252 latching the output of arithmetic and logic unit 248 in L clock phase.

The control signal sel—result from register 246 is determined in L clock phase of the cycle 5 and supplied to selector 260. At this time, the control signal Φload has already been brought to the false state in cycle 6 and only the control signal sel—result is in the true state. In this state, selector 260 selects data supplied to its B input from register 252 and provides the same to register 262. As a result, in the write back cycle of the operation instruction, data is written into a register designated by the destination operand of this operation instruction in the register file by write back stage WBS in T clock phase.

If there is no data dependency between the load instruction and the operation instruction, the control signal "izon" is in the false state. In this case, the control signals sel—op1, sel—op2 and sel—result from control circuit 228 are all in the false state. In this case, a control signal Φload is generated, data loaded from data memory 254 is written back into a corresponding register in cycle 5 of FIG. 9 according to the load instruction at first, and then selector 260 selects the output of register 250 supplied to its A input and transmits the same to register 262 in the next cycle. In this case, the operation instruction is executed according to correct data OP1, OP2 supplied to arithmetic and logic unit 222 of execution stage EXCS and the operation result thereof is written into a corresponding register in the write back cycle without causing any slot in the pipeline.

As the fact that the memory is not accessed in an operation instruction is advantageously utilized, so that a selection operation is carried out with respect to data loaded from data memory 254 and data from the source registers in memory access stage MEMS to perform an operation on correct data, the operation instruction is executed without causing any slot in the pipeline. Therefore it becomes unnecessary to stall the pipeline or insert an idle "NOP" instruction between the instruction codes, so that a correct operation result can be obtained at high speed.

Figure 10:
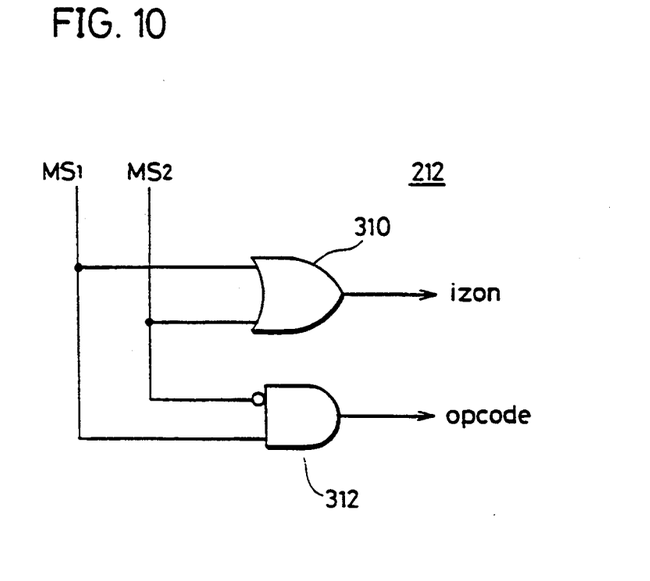
FIG. 10 is a diagram showing an example of the specific structure of the determination circuit shown in FIG. 8.

FIG. 10 is a diagram showing one example of a specific structure of determination circuit 212 included in instruction decode stage IDS shown in FIG. 8. In FIG. 10, determination circuit 212 includes an OR gate circuit 310 for taking a logical sum of detection signals MS1 and MS2 of coincidence detection circuits 208 and 210 and a gate circuit 312 for receiving the detection signals MS1 and MS2. A control signal "izon" is generated from gate circuit 310 and a control signal "opcode" is generated from gate circuit 312. When at least one of the detection signals MS1 and MS2 is brought to "true state", gate circuit 310 brings the control signal "izon" to the true state.

Gate circuit 312 includes an AND gate circuit for receiving the detection signal MS1 at is true input and the detection signal MS2 at its false input. If the detection signal MS1 is in the true state and the detection signal MS2 is in the false state, gate circuit 312 brings the control signal "opcode" to the true state while if the detection signal MS1 is in the false state and the detection signal MS2 is in the true state, it sets the control signal "opcode" in the false state.

In the structure of gate circuit 312 shown in FIG. 10, it is assumed that the detection signals MS1 and MS2 are not brought to the true state together. In order to generate a more precise control signal which permits the signals MS1 and MS2 to be in true state at the same time, the gate circuit 312 may be omitted and the control signal "opcode" may include control signals MS1, MS2 of 2 bits.

Figure 11:
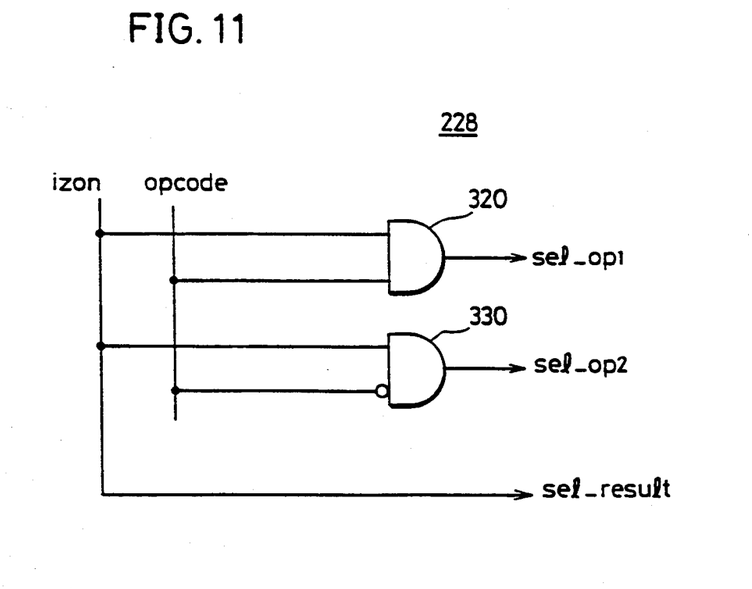
FIG. 11 is a diagram showing an example of the specific structure of the control circuit shown in FIG. 8.

FIG. 11 is a diagram showing one example of a specific structure of control circuit 228 shown in FIG. 8. In FIG. 11, control circuit 228 includes gate circuits 320 and 330 for receiving control signals "izon" and "opcode". A control signal sel—op1 is generated from gate circuit 320 and a control signal sel—op2 is generated from gate circuit 330.

Gate circuit 320 brings the control signal sel—op1 to the true state if the control signal "izon" and the control signal "opcode" are both in the true state. That is, if the detection signal MS1 is in the true state and the control signal "izon" is generated, it is indicated that data of the first source register should be transmitted.

Gate circuit 330 receives a control signal "izon" at its true input and receives a control signal "opcode" at its false input. If the control signal "izon" is in the true state and the control signal "opcode" is in the false state, gate circuit 330 sets the control signal sel—op2 in the true state. That is, if the second source operand uses load data, a control signal sel—op2 is generated. The control signal sel—result uses the control signal "izon" as it is. In this case, control circuit 228 is included in execution stage EXCS, and the control signals sel—op1, sel—op2 and sel—result have their states determined with a delay by 1 clock cycle with respect to the control signals "opcode" and "izon" from instruction decode stage IDS. This structure can be implemented by providing a T latch for latching data at T clock and an L latch for latching this T latch output according to L clock in the front stage of gate circuits 320 and 330 in the structure shown in FIG. 11. Alternatively, the T latch and the L latch may be provided in the output portions of gate circuits 320 and 330.

Figure 12:
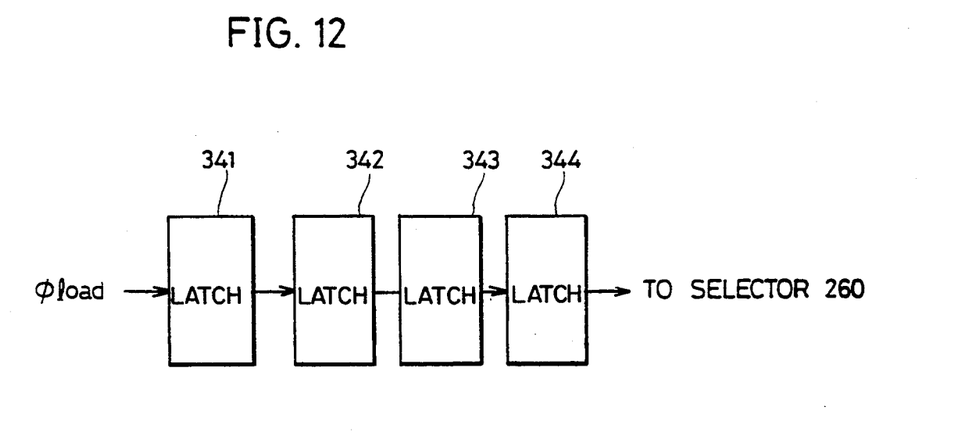
FIG. 12 is a diagram showing a transmission path of the control signal Φload shown in FIG. 8.

FIG. 12 is a diagram showing a path through which a signal Φload from instruction decoder/controller 200 is supplied to selector 260. In FIG. 12, the transmission path of the control signal Φload generated in instruction decoder/controller 200 includes a T latch 341 for latching the control signal Φload in T clock phase, an L latch 342 for latching the output of T latch 341 in L clock phase, a T latch 343 for latching the output of L latch 342 in T clock phase, and an L latch 344 for latching the output of T latch 343 in L clock phase. The output of L latch 344 is supplied to the control input of selector 260. In accordance with this structure, the control signal Φload generated in L clock phase of cycle 2 in the structure shown in FIG. 9 is latched by latch 344 in L clock phase of clock cycle 4 to be in a definite state.

The structure of a normal selection circuit can be employed for selection circuits 242 and 244. The structures of arithmetic and logic units 222 and 248 may be such that both of them execute the same operation.

The output of data memory 254 is supplied to register 262 through selector 260 in write back stage WBS. Instead, the load data from data memory 254 may be bypassed to selection circuits 242 and 244 and, at the same time, be stored in register 262 and an I/O register (not shown; see FIG. 6), and the contents of register 262 and the I/O register may be selectively written into the register file according to the control signals Φload and sel_result.

Figure 13:
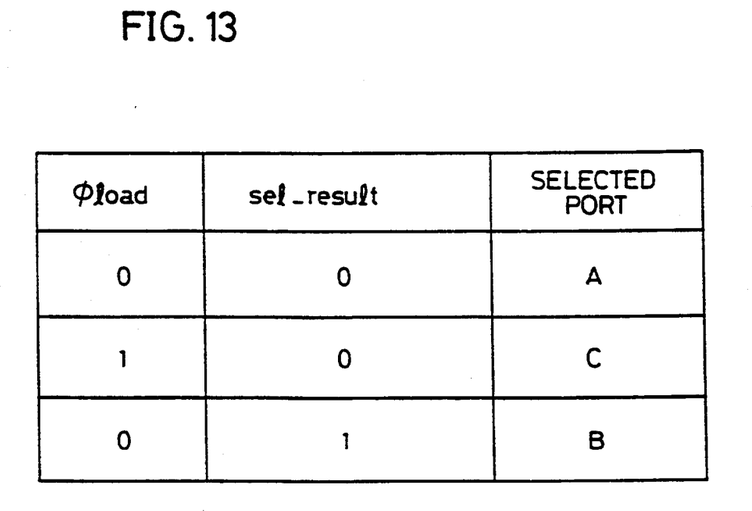
FIG. 13 is a diagram showing in a table the logic realized by a selector 260 shown in FIG. 8.

FIG. 13 is a diagram showing in a table a logic performed by selector 260. Selector 260 selects the output supplied from register 250 to the input A if the control signal Φload and the control signal sel_result are both "0" representing "false". If the control signal Φload is "1" of the true state and the control signal sel result is "0" of the false state, the load data supplied from data memory 254 to the input C is selected. If the control signal Φload is "0" of the false state and the control signal sel_result is "1" of the true state, the data supplied from register 252 to the input B, i.e., the operation result obtained in the memory access stage is selected. Various kinds of structures can be considered as a circuit structure for realizing this logic and any structure of 3 to 1 selection circuit may be employed.

Any operational processing unit may be employed as far as it includes a structure in which instructions are executed in parallel according to the pipeline scheme.

As stated above, in accordance with the present invention, there are two routes provided, that is, a path through which load data from the data memory is bypassed and an operation is directly performed on data from the register file and a path through which selection and operation is performed with respect to the register file data and the loaded memory data, and selection of the operation routes is made according to the data dependency between the load instruction and the operation instruction. As a result, an operational processing unit can be provided capable of executing instructions at high speed where it is not necessary to stall a pipeline and also to insert a useless instruction such as "NOP" for eliminating the pipeline stall without causing a slot in the pipeline in the operation instruction following the load instruction.

Additionally, this structure can substantially employ the conventional load forwarding architecture as it is, so that an operational processing unit can be provided capable of executing instructions at high speed with a simple circuit structure without making a considerable change of specification.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pipeline processing apparatus including a plurality of registers and a data memory, comprising:

memory access means for accessing the data memory to read data therefrom in response to a load instruction;

register access means responsive to an operation instruction for reading out data to be processed from said plurality of registers;

first operation means for performing an operation on data received from said register access means;

determination means for determining whether said operation instruction has a data dependency on said load instruction;

first selection means responsive to a result of determination by said determination means for selecting data necessary for an operation according to said operation instruction among the data from said register access means and the data loaded by said memory access means;

second operation means for performing the operation on data selected by said first selection means;

second selection means responsive to the result of determination by said determination means for selecting either of an output of said first operation means and an output of said second operation means, thus selected output being written back into a register in said plurality of registers.

2. A pipeline processing apparatus according to claim 1, wherein said determination means includes first storage means for storing a first source register operand included in said operation instruction, second storage means for storing a second source register operand in said operation instruction, third storage means for storing a destination register operand included in said load instruction, detection means for detecting coincidence between the operand in said third storage means and one of the operands in said first and second storage means, and control means responsive to an output of said detection means for generating first and second control signals for controlling respective selecting operations of said first and second selection means.

3. A pipeline processing apparatus according to claim 2, wherein said register access means includes means for detecting a load instruction and generating a load indicating signal indicating that a load instruction is to be executed, and wherein said second selection means includes means (FIG. 13) responsive to said second control signal and said load indicating signal, for selecting one of the outputs of the first operation means and the second operation means and the data loaded from said data memory by said memory access means.

4. A pipeline processor including a register file with a plurality of registers, comprising:

an instruction decode stage for decoding an instruction fetched from an instruction memory, said decode stage including register access means for reading data of a register in the register file corresponding to a fetched and decoded instruction, and detection means for detecting an operation instruction to be executed following a load instruction;

an instruction execution stage for performing a predetermined operation on data received from said register access means, and including bypassing means for bypassing the data from said register access means without any arithmetic or logical operation thereon;

determination means responsive to said detection means for determining whether there exists data dependency between said operation instruction and said load instruction;

a memory access stage for accessing a data memory when a load instruction is supplied from said instruction stage, said memory access stage including selection means responsive to said determination means for selectively passing one of the data from said bypassing means and data loaded from said data memory, and another operation means for performing the predetermined operation on data received from said selection means; and a write back stage for writing data into a register in the register file, said write back stage including another selection means responsive to said determination means for selectively passing one of the outputs of the operation means and the another operation means, for the writing back into a register of the register file.

5. A pipeline processor according to claim 4, wherein said another selection means further includes means (FIG. 13) responsive to said detection means and said determination means for selectively passing one of the outputs of the operation means and the another operation means and the data loaded from said data memory.

6. A pipeline processor according to claim 4, wherein said determination means includes first means for detecting that a destination register indicated by said load instruction is the same as a source register indicated by said operation instruction, second means responsive to said first means for generating a first control signal for controlling a selection operation of said selection means and a second control signal for controlling a selection operation of said another selection means.

7. A pipeline processor according to claim 6, wherein said determination means further includes delay means for delaying said second control signal to adjust the timing of the selection of said another selection means to an operation timing to said memory access stage.

8. A method of executing an instruction comprising the steps of:

decoding an instruction fetched from an instruction memory, and reading data of a corresponding register of a register file;

performing an operation on data read out from the corresponding register;

bypassing the data read out from the corresponding register;

detecting that a currently executed instruction is an operation instruction immediately following a load instruction and having data dependency thereon;

accessing a data memory in response to the load instruction for reading out data designated by the load instruction therefrom;

bypassing data read out and loaded from the data memory;

selectively passing the data read out from the corresponding register and the data read out and loaded from the data memory to provide data necessary for execution of said operation in response to the result of the detection in said step of detecting;

performing said operation on the data thus selectively passed; and further selectively passing the result of operation on the data from the corresponding register and the result of operation on the data thus selectively passed in response to the result of the detection in said step of detecting.

9. A method of executing an instruction according to claim 8, wherein the data from the corresponding register includes data from two different registers, and wherein said step of selectively passing includes the step of selecting one of the data from the two different registers, and the data read out and loaded from the data memory, when the result of the detection in said step of detecting indicates that the operation instruction utilizes the data loaded from the data memory in response to the load instruction.

10. A method of executing an instruction according to claim 8, further including the steps of:

detecting a load instruction for generating a load indicating signal; and selecting one among the result of operation on the data of the corresponding register, the result of operation on thus selectively passing data and the data read out and loaded from the data memory in response to the load indicating signal and the result of the detection in said step of detecting.

* * * * *